Jan. 1, 1963  J. R. N. DUBOIS  3,071,503
PROCESS FOR WELDING THERMOPLASTIC MATERIALS
Filed July 20, 1959
Fig.1.
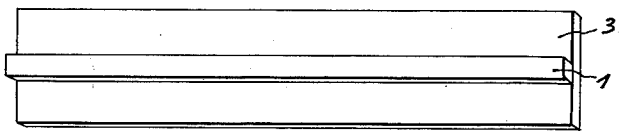
Fig.2.
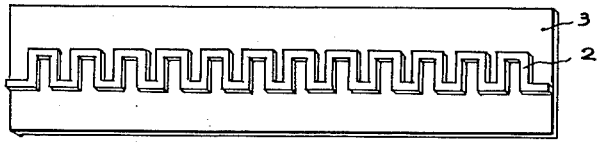
Fig.3.     Fig.4. 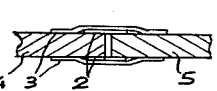    Fig.5. 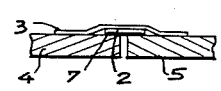
Fig.6. 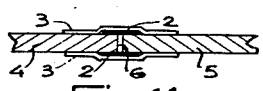    Fig.7.     Fig.9. 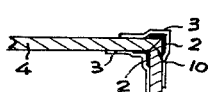
Fig.11. 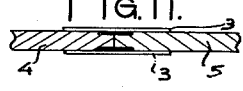    Fig.8. 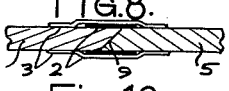    Fig.14. 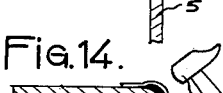
Fig.10.
Fig.12.
Fig.13.
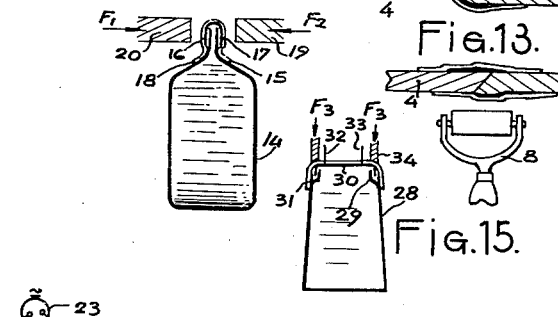
Fig.15.
Fig.17
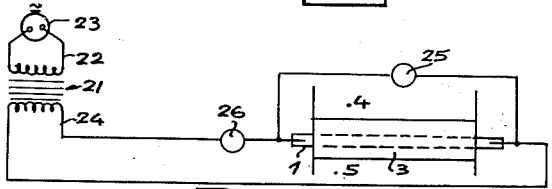
Fig.16.
INVENTOR
JACQUES ROBERT NICOLAS DUBOIS
BY
MAXWELL E. SPARROW
ATTORNEY 3,071,503
PROCESS FOR WELDING THERMOPLASTIC
MATERIALS
Jacques Robert Nicolas Dubois, 48 Rue Dutot,
Paris 15e, France
Filed July 20, 1959, Ser. No. 828,107
Claims priority, application France Nov. 13, 1958
4 Claims. (Cl. 156—272)

The invention relates to a soldering process for thermoplastic materials.

Known processes are particularly delicate to apply in a case where great lengths require to be soldered, so much the more if the soldering lines must be curved or if the work point is difficult of access. Generally, these solderings are effected from point to point by heating tongs on parts placed edge to edge to form a lap-joint and the latter are then extended, the lap-joint opened out and the soldering flattened. The difficulty is still greater if the parts are very thick.

Moreover, the considerable heat inertia of certain materials does not permit the soldering process to be employed by heating. The free melting accompanied by flowing characterising other materials makes soldering with a flame blowpipe or hot air very delicate. The considerable dimensions of parts are an obstacle to the utilizing of the high frequency soldering process or by heating clutches. The lack of strength and absence of guarantee of adhesions and thermoadhesions are the cause of eliminating these processes in certain applications.

The present invention obviates these disadvantages by creating a soldering process characterised in that it consists of bringing at least two parts together for soldering, and on either side of the joint of these two parts, to place a conductor, forming an electric resistance, held on said parts by means of an adhesive strip, this conductor being fed during a given time with low voltage electric current.

The invention also applies to the equipment and products obtained by means of the process and this equipment.

Various other characteristics of the invention will moreover be revealed by the detailed description which follows.

Forms of embodiment of the invention are shown, by way of non-restrictive example, in the attached drawings.

FIGURES 1 and 2 are perspective views of the heating element of the process according to the invention.

FIGURES 3, 4 and 5 are cross-sections showing these elements in operation.

FIGURES 6 to 10 are cross-sections of objects to be soldered showing the various methods of preparing the solderings.

FIGURES 11 to 15 are cross-sections of these same objects at a characteristic stage of the carrying out of these solderings.

FIGURE 16 is an electric diagram of the device for effecting soldering according to the invention.

FIGURES 17 and 18 are plane views of various forms of the bonding of this device to the heating element.

Figure 18:
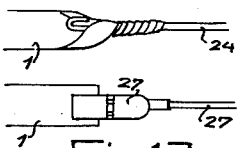

The soldering process consists of bringing two parts of thermoplastic material together for soldering, and according to their joining line, to place an electric resistance supplying the quantity of heat required for producing the soldering whilst avoiding reaching a temperature where the material of which these parts is made runs.

FIGURES 1 and 2 show forms of embodiment of a resistance of this kind. The latter has the shape of a film 1 (FIGURE 1) made of a current conducting alloy whose nature is selected according to the resistivity required. The quantity of heat given off per length unit of the soldering is function of the resistivity and the section of the conductor, the duration of passage and the intensity of the electric feed current. The parameters which can be applied in this case, are the thickness of the film, because its width is determined by that of the heating zone, by the intensity of the current input at low voltage, which may be controlled, and by the duration of the passage of the current. It is quite clear that one must not go below a minimum time which is fixed by the actual nature of the thermoplastic material, for it is necessary that this heat should be evenly transmitted through the thickness of the parts and that the temperature at any point must not exceed the free melting temperature of this material.

A conductor 2 (FIGURE 2) has a general crenellated shape similar to that of fret ornamentation. This conductor has the advantage of being able to be deformed in its plane so as to assume a curved soldering line. Moreover, per unit of soldering length, the length opened out by this conductor is greater, which constitutes an additional parameter, on which one can act for varying the resistance of the conductor. This form of embodiment can also be employed, when it is required to cover a somewhat extensive heating zone with a thin conductor section, without it being necessary too greatly to reduce the thickness of this conductor.

The conductor is stuck on to an adhesive strip 3 formed of a paper or cellophane band or by a film of plastic or other suitable material on which an adhesive substance is applied. The resistance to heat of the adhesive strip must exceed that of the material forming the parts to be soldered. As can be more particularly seen in FIGURES 3, 4 and 5, the adhesive strip 2 is stuck on two parts 4 and 5 separated from each other by a distance corresponding to a joint 6 whose measurement is selected according to the nature of the thermoplastic materials to be soldered and the thickness of the parts. The conductor 2 is placed on this joint and spread out on either side of a zone corresponding to the heating surface.

The conductor can be positioned on the adhesive strip in the workshop and delivered to the user in rolls. The placing of the conductor and its adhesive strip is very easy: it is only necessary to apply the strip to the joint of the parts to be soldered as it is unrolled.

In FIGURE 3, a single conductor is placed on either of the faces of these parts. In FIGURE 4, two conductors are respectively placed on one or other face of these parts. It can be advantageous to multiply the number of conductors stuck on one and the same adhesive strip. In FIGURE 5, 7 designates a thermoplastic glue which is evenly spread over the conductor 2. In this case, the conductor 2, when fed, causes the soldering of the parts 4 and 5 at the same time as the setting of the glue 7, and hence, the conductor 2 definitely adheres to the soldered parts 4 and 5. When the adhesive strip 3 is removed after soldering, the conductor 2 remains fixed on the parts 4 and 5, and can then be utilized as a heating resistance. This is particularly advantageous when the soldered parts 4 and 5 are shaped in tanks intended to contain a heating fluid. The conductor 2, being fed with current, provides the heat which is transmitted by means of the tank to the contained fluid, so that the melting temperature of the thermoplastic material of which the tank is made can never be reached.

The parts for soldering are prepared in different ways: some examples are shown in FIGURES 6 to 14. The parts 4 and 5 can be soldered end to end (FIGURE 6), and in this example, two conductors are placed on either side of the space 6 separating the parts 4 and 5. The conductors 2 are fed with electric current, and after a suitable time, the soldering is made by contact (FIGURE 11) without the material running. It may happen that the material runs locally, which does not constitute a major disadvantage, for the material during soldering, is softened and its mechanical resistance is nil. Now, the adhesive strip is stuck beyond the plasticity zone, on the cold material, hence resistant. Consequently, the assembly formed by the cold part of the two parts and the adhesive strip, at least, has a continuous mechanical resistance and this adhesive strip forms a support for the pasty material.

When the solder has cooled, the adhesive strip and conductor can be removed, or only the adhesive strip, or everything left in position.

The parts 4 and 5 can be soldered by overlapping: FIGURE 7 shows the preparation of these parts and the positioning of the conductors 2; FIGURE 12 shows the result obtained when the soldering has been made. FIGURE 13 shows another result obtained when a slight pressure is exerted, for example, by means of a pressing roller 8, on the material in the plastic state to level the soldering on the same plane as the parts.

FIGURE 8 shows the soldering end to end of two parts 4 and 5 and has a chamfer 9.

The parts 4 and 5 can be corner soldered (FIGURE 9): for this, their ends are bevelled 10. The adhesive strips 3 holding the conductors 2 are stuck in the corners, as can be seen in the drawing. The soldering can be effected without pressure, but it can be advantageous to hammer the soldering line (FIGURE 14). A rivet-snap 11 is placed inside the angle and by means of a hammer 12 the material is deformed to round it off 13.

Bags 14 of thermoplastic material can be closed, after filling, by soldering the edges 15 and 16 of the opening of this bag. These edges are covered with a conductor 17 bent to a U-shape (FIGURE 10) which is retained by an adhesive strip 18 shaped in the same way and whose edges are fixed on the neck of the bag. While the conductor 17 is traversed by the current, pressure is exerted on this conductor by means of clutches 19, 20 moving in the direction of the arrows $F_1$, $F_2$. This has the effect of compressing the plastic material, when softened, and facilitating soldering bonds.

FIGURE 15 shows a receptacle 28 of thermoplastic material which must be closed under a vacuum when filled. It has a swelling 29 on its neck on which a basin 30 of conductive alloy is placed, retained by an adhesive strip 31 whose ends are stuck on to the body of this receptacle. Electrodes 32 and 33, connected to a current generator, intercept the basin 30 in the zone not covered by the adhesive strip 31. When the current passes, the basin heats up and softens the swelling 29 by contact. A pressure $F_3$ exerted by a ring 34 on the basin causes the latter to penetrate into the swelling.

The equipment put into operation (FIGURE 16) comprises a step-down transformer 21 whose high tension circuit 22 is connected up to a current intake 23 on the mains. The low tension circuit 24 of this transformer is connected to the ends of the conductor 1 stuck on to the adhesive strip 3. A voltmeter 25 is mounted in shunt on the conductor 1, so as to control the tension to which it is subjected and an ammeter 26 is mounted in series on the circuit 24 to control the intensity of the current traversing the conductor 1. The connection of the low tension circuit 24 to the ends of the conductor 1 can be obtained in various ways: for example, the ends of the circuit wires 24 are integral with the tongs 27 (FIGURE 17) and these tongs grip on to the ends of the conductor 1. Thus, the ends of the conductor 1 (FIGURE 18) can be twisted on to the ends of the corresponding wire of the low tension circuit 24 or on pencils integral with these wires.

Various modifications can moreover be applied to the forms of embodiment, shown and described in detail, without going outside of the scope of the invention. In particular, for carrying out a heating programme predetermined in function of the nature of the materials to be soldered, characteristics of shape and dimensions of the parts, their installing and working, the conductor forming the heat resistance can be made of any suitable alloy, shaped to obtain a given resistivity and exchange surface, and fed with electric current whose characteristics are established for the selected duration. Furthermore, the adhesive strip and conductor can be prepared beforehand and stored in rolls.

I claim:
1. The process of welding longitudinal sections of thermoplastic materials comprising the steps of placing said longitudinal sections into close relationship to one another, covering said sections lengthwise with a metallic electric resistance strip, covering said strip with an adhesive tape, said tape substantially having a greater width than said strip, rendering said sections covered by said electric strip into a viscous fusible state by applying a heating electric current of low voltage to said strip and removing said strip and said tape after welding said sections together.

2. The process, according to claim 1, and applying pressure to said sections while being in said viscous fusible state.

3. The process of welding longitudinal sections of sheets of thermoplastic materials comprising the steps of placing said sections into close relationship to one another, covering said sections lengthwise on the upper side and on the under side of said sheets with a metallic electric resistance strip, covering said strips with adhesive tapes, said tapes substantially having a greater width than said strip, rendering said sections covered by said strips into a viscous fusible state by applying a heating electric current of low voltage to each of said strips and removing said strips and said tapes after welding said sections together.

4. The process, according to claim 3, and applying pressure to said sections while being in said fiscous fusible state.

References Cited in the file of this patent

UNITED STATES PATENTS

| | | |
|---|---|---|
| 1,384,467 | Homan | July 12, 1921 |
| 2,514,201 | Brown | July 4, 1950 |
| 2,647,072 | Smith | July 28, 1953 |
| 2,695,853 | Foreit | Nov. 30, 1954 |
| 2,713,017 | Bruns | July 12, 1955 |
| 2,742,390 | Beck | Apr. 17, 1956 |
| 2,831,049 | Cabral | Apr. 15, 1958 |
| 2,938,103 | Crump | May 24, 1960 |
| 2,964,587 | Minot | Dec. 13, 1960 |

FOREIGN PATENTS

| | | |
|---|---|---|
| 585,195 | France | Dec. 4, 1924 |